US005748430A

United States Patent [19]
Bird

[11] Patent Number: 5,748,430
[45] Date of Patent: May 5, 1998

[54] INTEGRATED HYBRID SURGE PROTECTOR ARCHITECTURE CONFIGURED TO ACCOMODATE MULTIPLE REPLACEABLE COMMUNICATION SIGNAL SURGE PROTECTION MODULES IN COMMON HOUSING WITH AC VOLTAGE RECEPTACLE TERMINAL STRIP

[75] Inventor: Anthony Owen Bird, Indian Harbour Beach, Fla.

[73] Assignee: Atlantic Scientific Corporation, West Melbourne, Fla.

[21] Appl. No.: 741,128

[22] Filed: Oct. 31, 1996

[51] Int. Cl.[6] .......... H02H 9/00

[52] U.S. Cl. .......... 361/119; 361/56; 361/111

[58] Field of Search .......... 361/56, 58, 91, 361/111, 117, 118, 119, 120, 127, 115

[56] References Cited

U.S. PATENT DOCUMENTS

| | | | |
|---|---|---|---|
| 4,343,527 | 8/1982 | Harrington et al. | 179/178 |
| 4,389,695 | 6/1983 | Carpenter, Jr. | 361/56 |
| 4,438,477 | 3/1984 | Cawley | 361/119 |

*Primary Examiner*—Jeffrey A. Gaffin
*Assistant Examiner*—Stephen Jackson
*Attorney, Agent, or Firm*—Charles E. Wands

[57] ABSTRACT

A hybrid surge protector architecture is configured to accommodate a plurality of replaceable L-shaped communication signal surge protection modules and a multi receptacle AC voltage terminal strip in the same housing architecture. The modules may be configured to provide surge protection for different types of communications signal lines. The hybrid surge protector has a housing structure which contains a floor, a vertical wall and convex cover. A first portion of the wall has an opening in which an AC voltage terminal strip is installed. A second portion of the wall has an aperture for a plurality of communication signal surge protection circuit modules. Hot and neutral leads of the terminal strip are coupled to input ports of the AC voltage surge protection circuit. A reference ground conductor for the terminal strip and the AC voltage surge protection circuit is mounted along the housing floor adjacent to the terminal strip. Distributed along the housing floor adjacent to and connected to the AC voltage terminal strip are a plurality of electrical connectors, which are arranged to receive and physically capture ground conductor elements of respective ones of the removable communication signal surge protection circuit modules. Flexible tabs of the modules are captured by slots in the housing floor to facilitate insertion and removal.

20 Claims, 3 Drawing Sheets

INTEGRATED HYBRID SURGE PROTECTOR ARCHITECTURE CONFIGURED TO ACCOMODATE MULTIPLE REPLACEABLE COMMUNICATION SIGNAL SURGE PROTECTION MODULES IN COMMON HOUSING WITH AC VOLTAGE RECEPTACLE TERMINAL STRIP

FIELD OF THE INVENTION

The present invention relates in general to surge protection devices and systems, and is particularly directed to a new and improved hybrid surge protector architecture that is configured to accommodate a plurality of replaceable communication signal surge protection modules that are integrated in a common housing, with an AC voltage terminal strip having a plurality of AC voltage receptacles, with surge protection for the AC voltage terminal strip being provided by way of a common AC voltage surge protection circuit.

BACKGROUND OF THE INVENTION

In addition to providing electrical surge protection for AC power supply links, presently commercially available surge protection systems are designed as hybrid systems, providing surge protection for communication signal lines serving a variety of electronic equipments, such as computer workstations, copiers, facsimile machines, and the like. To this end such systems are configured as 'stacked', multi-unit architectures, the size and configuration of which depends upon the number of pieces of equipment and the number of communication signal lines being protected. While such stacked module systems are effective to provide the surge protection desired, because the surge protection modules are relatively large sized, stand-alone, self-contained items, physically interconnected with one another in a cascaded fashion, the resulting system is both physically cumbersome and expensive.

SUMMARY OF THE INVENTION

In accordance with the present invention, the physical size and cost shortcomings of conventional hybrid surge protection systems, described above, are effectively obviated by a surge protector that integrates a plurality of individually replaceable communication signal surge protection circuit modules and a multi receptacle AC voltage terminal strip in the same housing architecture. Respectively different ones of the communication signal surge protection circuit modules may be configured to provide surge protection for different types of communication signal lines, such as those which transport telecommunication signals, cable television signals, and the like.

To this end the integrated hybrid surge protector architecture of the present invention has a housing structure which contains base or floor having a generally rectangular floor portion contiguous with a curvilinearly shaped floor portion. Extending from the floor is a vertical wall which is covered by a convex cover. The vertical wall has a generally straight rear wall portion and a curvilinear, tapered wall portion. Rear wall portions of the vertical wall and the cover have mutually opposing semicircular openings which capture strain relief grommet for an AC power cord.

A first end of the curvilinear, tapered portion of the wall is adjacent to a generally straight, side edge of the floor and is spaced apart from a first end of the rear wall portion. A second end of the curvilinear tapered portion of the wall adjoins a generally straight, second side edge of the floor and is spaced apart from a second end of the rear wall. The separation between the first end of the curvilinear, tapered wall portion and the first end of the rear wall portion provides an aperture in which an AC voltage terminal strip is installed, while the separation between the second end of the curvilinear, tapered wall and the second end of the rear wall define an aperture for a plurality of communication signal surge protection circuit modules.

The interior surface of the cover has a plurality of slotted ribs that provide stabilizing guides for respective modules inserted into the module aperture. The cover also includes a set of end wall panels for ones of the communication signal surge protection circuit module slots, and providing an insulation barrier adjacent to AC terminal voltage receptacles of the AC voltage terminal strip. An apex region of the curvilinearly shaped dome portion of the cover has an aperture sized to receive an ON-OFF switch of a printed circuit board mounted to the housing floor and containing an AC voltage surge protection circuit to which the AC voltage terminal strip is connected. A resetable circuit breaker is mounted to the second end of the curvilinear, tapered wall portion and is electrically connected to the AC voltage terminal strip and the AC voltage surge protection circuit.

The housing floor further includes an arrangement of bosses associated with respective AC voltage receptacles of the terminal strip. The hot and neutral leads of the terminal strip are coupled to respective input ports of the AC voltage surge protection circuits A reference (earth) ground conductor for the terminal strip and the AC voltage surge protection circuit is mounted along the housing floor adjacent to the terminal strip. Distributed along the housing floor adjacent to and connected to the AC voltage terminal strip are a plurality of dual blade-configured electrical connectors, which are arranged to receive and physically capture ground conductor elements of respective ones of removable communication signal surge protection circuit modules.

Each module is preferably an L-shaped structure having a side wall and an end wall adjoined to a flexible tab and containing a pair of signal input and output ports, such as RJ 45 telecommunication connectors. Adjacent to the module's side wall are a pair of upper and lower slotted guides which capture a surge protection circuit board. The upper guide also includes a ridge that fits within a slotted rib of the interior surface of the cover. Surge protection circuitry of the communication signal surge protection circuit board is coupled between input and output port connections and a ground reference terminal. The input port conductors of the surge protection circuit module are coupled to the conductors of the signal input port connector and its output port conductors are coupled to the conductors of the signal output port connector. To provide a ground reference connection to a respective module's surge protection circuit board, a generally planar ground conductor extends rearwardly from the surge protection circuit board and is dimensioned to fit within and be physically and electrically connected to a respective dual blade-configured electrical connector of the reference ground conductor that extends along the housing floor.

To securely capture the flexible tabs of respective modules as the modules are installed in their associated slots, the housing floor contains a plurality of depressions which contain ramp regions that terminate at openings sized to engage the flexible tabs of the communication signal surge protection circuit modules. As a result, as a module is inserted into its slot, its generally planar ground conductor becomes physically and electrically connected to a respective dual blade-configured electrical connector of the reference ground conductor, and flexible tab rides over the ramp region and snaps into the opening. The opening facilitates removal of the module, by manually pushing in the tab so that the tab rides over the ramp region as the module is withdrawn from its slot.

DETAILED DESCRIPTION

Figure 1:
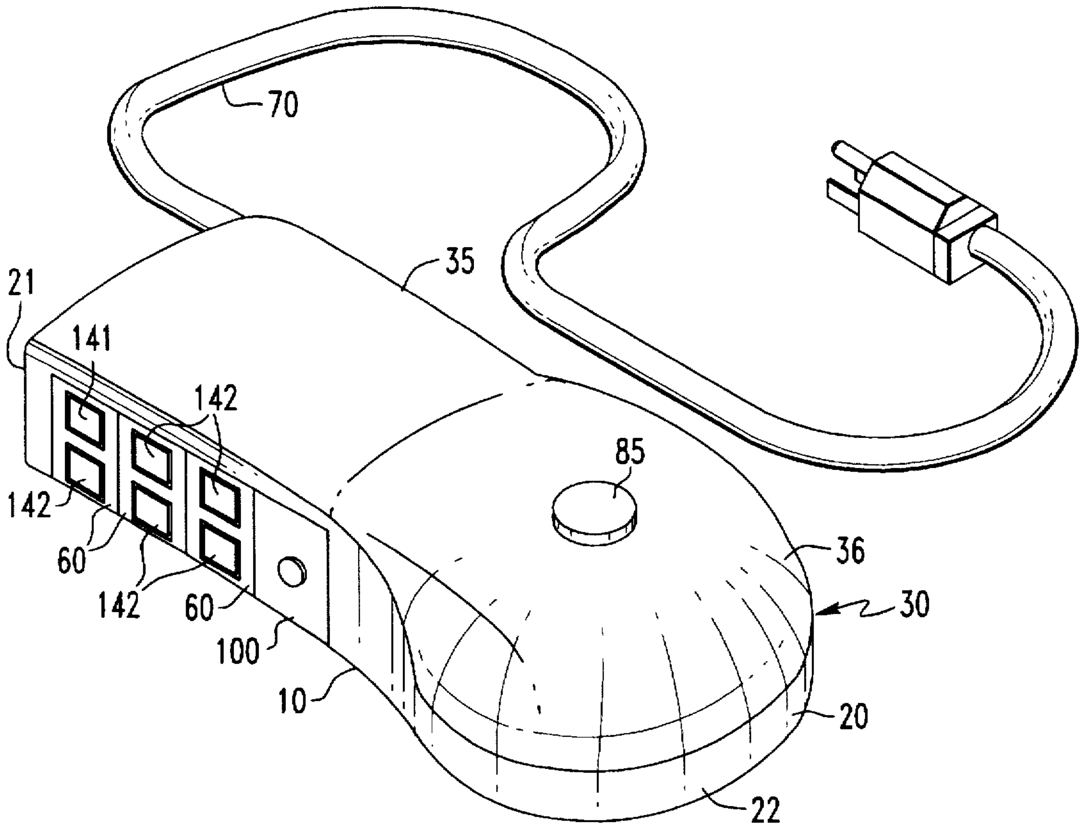
FIG. 1 is a diagrammatic external perspective view of the integrated hybrid surge protector architecture of the present invention.
Figure 2:
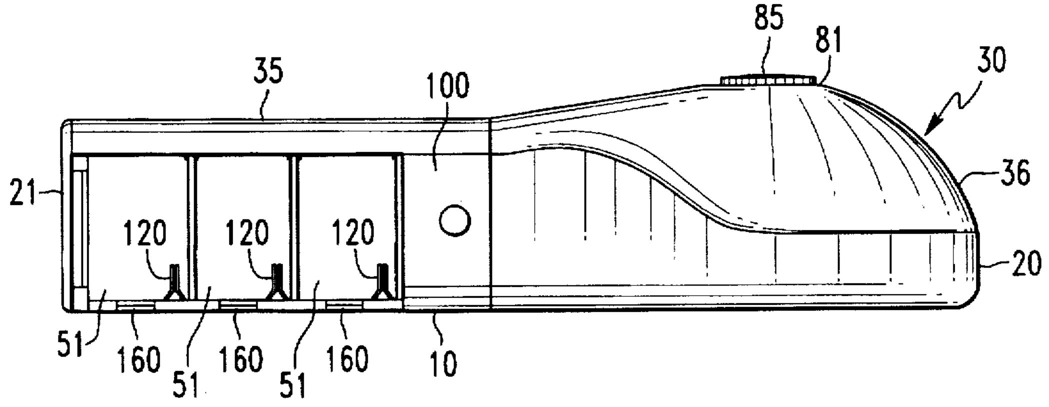
FIG. 2 is a diagrammatic side view of FIG. 1.
Figure 3:
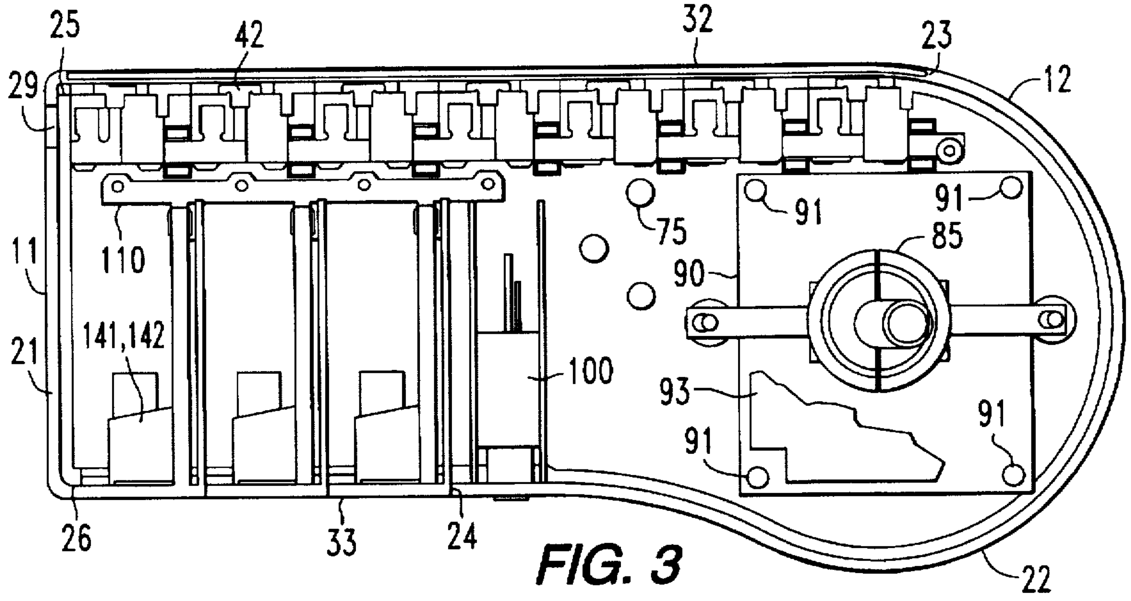
FIG. 3 is a diagrammatic internal plan view of FIG. 1.
Figure 5:
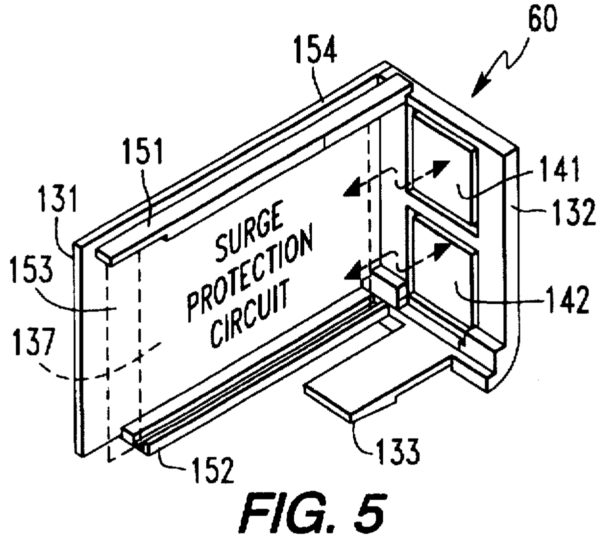
FIG. 5 is a diagrammatic perspective view of a communication signal surge protection module installable in the architecture of FIGS. 1–4.
Figure 6:
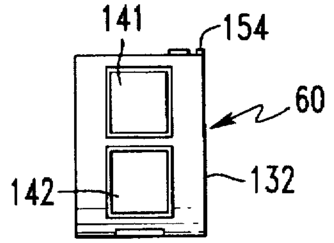
FIG. 6 is a diagrammatic end view of FIG. 5.
Figure 7:
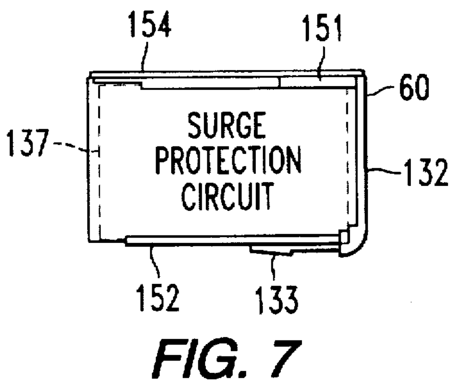
FIG. 7 is a diagrammatic side view of FIG. 5.
Figure 8:
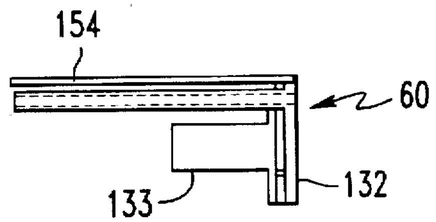
FIG. 8 is a diagrammatic plan view of FIG. 5.
Figure 4:
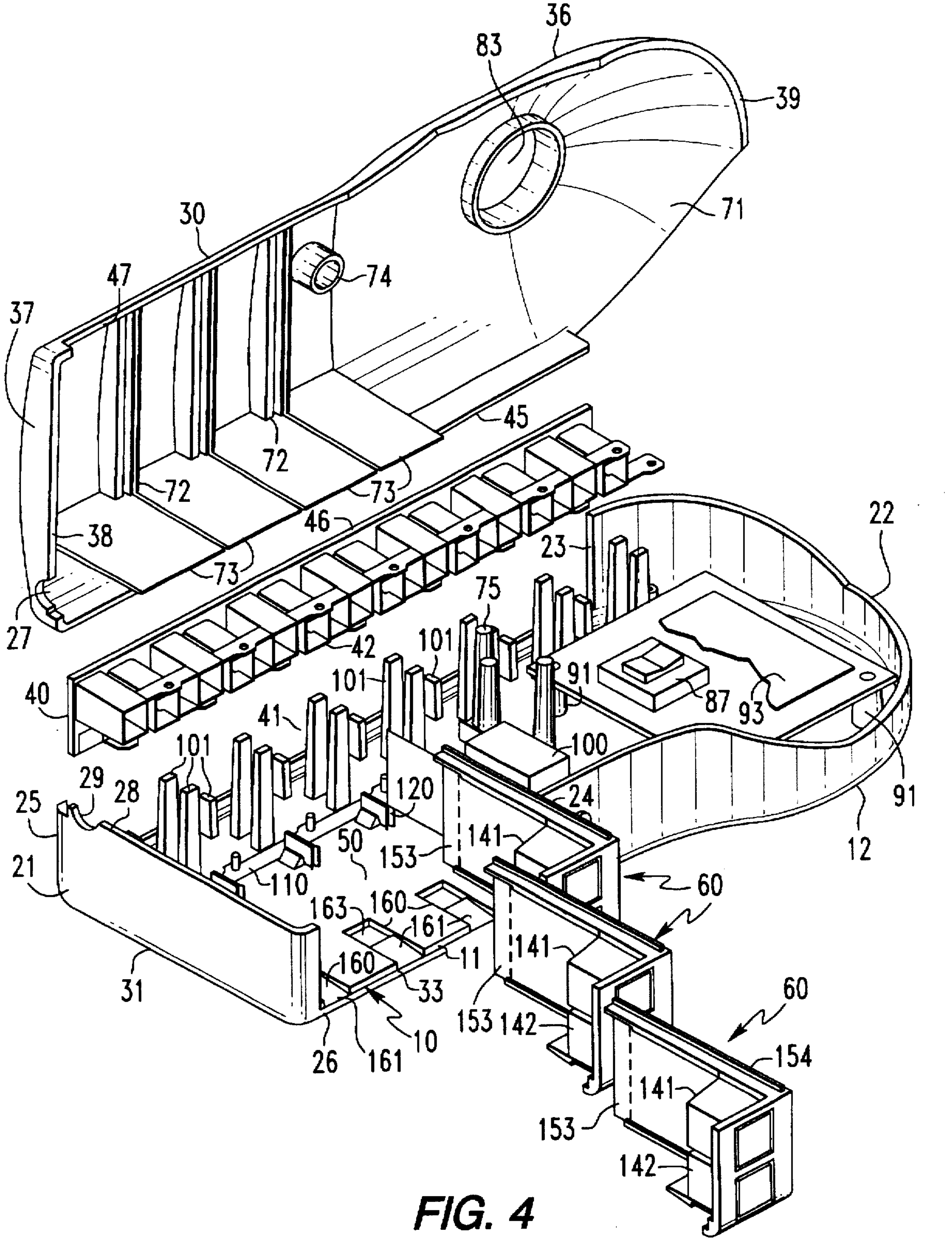
FIG. 4 is an exploded diagrammatic perspective view of FIGS. 1–2.

The general configuration of the integrated hybrid surge protector architecture of the present invention is diagrammatically illustrated in the external perspective view of FIG. 1, the side external side view of FIG. 2, the internal plan view (cover removed) of FIG. 3, and the exploded perspective view of FIG. 4 as comprising a base or floor 10, having a generally rectangular floor portion 11 that is contiguous with a curvilinearly shaped floor portion 12. Extending from the floor 10 is a vertical wall 20. A cover 30 is disposed atop the vertical wall 20, to close the unit. Each of the floor, wall and cover of the surge protector is made of a molded plastic material, such as UL94-5V, as a non-limiting example, that conforms with Underwriters Laboratories flame retardant standards.

Vertical wall 20 has a generally straight rear wall portion 21 extending from a rear floor edge 31 of floor portion 11, and a curvilinear, tapered wall portion 22 extending from the curvilinearly shaped floor portion 12. Rear wall portion 21 has a semicircular opening 29 which opposes a corresponding semicircular opening 27 in a rear edge 37 of the cover 30 to form a circular opening for receiving a strain relief grommet (not shown) for capturing an AC power cord 70.

A first end 23 of the curvilinear, tapered wall portion 22 is located adjacent to a generally straight, first side edge 32 of the floor 10, and is spaced apart from a first end 25 of the rear wall portion 21. A second end 24 of the curvilinear tapered wall portion 22 adjoins a generally straight, second side edge 33 of the floor and is spaced apart from a second end 26 of the rear wall portion 21.

The separation between the first end 23 of the curvilinear, tapered wall portion 22 and the first end 25 of the rear wall portion 21 provides a first aperture 41 that is sized to receive an AC voltage terminal strip 40, configured as a conventional AC voltage 'buzz bar' containing a plurality of AC voltage receptacles, as shown. Similarly, the separation between the second end 24 of the curvilinear, tapered wall portion 22 and the second end 26 of the rear wall portion 21 provides a second aperture 50 that defines a plurality of communication signal surge protection circuit module slots 51 in which respective communication signal surge protection circuit modules 60 are installable.

The cover 30 has a convex surface shape sides of which are generally complementary to the wall 20 and includes a generally rectangular portion 35 that is contiguous with a curvilinearly shaped dome portion 36. The rear edge 37 of the rectangular cover portion 35 has a bottom edge 38 that engages the top edge 28 of rear wall portion 21. Similarly, the curvilinearly shaped dome portion 36 has a bottom edge 39 of a complementary taper relative to that of the curvilinear, tapered wall portion 22. A first side 45 of the rectangular portion 35 of the cover is configured to extend across and close a top edge 46 of the AC voltage terminal strip 40. Similarly, a second side 47 of the rectangular portion 35 of the cover 30 is configured to extend across and define a top edge of the aperture 50, such that when communication signal surge protection circuit modules 60 are installed in associated slots 51 of the aperture 50, their top edges are closed by the second side 47 of the rectangular portion 35 of the cover 30.

As shown in FIG. 4, the interior surface 71 of cover 30 contains a plurality of slotted ribs 72 that provide stabilizing guides for respective ones of the modules 60 when inserted into aperture 50. Molded into cover 30 adjacent to ribs 72 is a set of panels 73 that serve as interior end walls for respective ones of the communication signal surge protection circuit module slots 51, providing an insulation barrier adjacent to AC terminal voltage receptacles of the AC voltage terminal strip 40. Also, a generally cylindrically configured boss cap 74 is sized and located to engage a boss 75 that projects vertically from the floor 10.

An apex 81 of the curvilinearly shaped dome portion 36 of the cover has a circular aperture 83 which is sized to receive a split disc-configured ON-OFF switch element 85 that engages a rocker switch 87 mounted on a voltage printed circuit board 90. Printed circuit board 90 is mounted to a set of bosses 91 molded into the interior surface of floor 10 and contains a conventional AC voltage surge protection circuit 93, to which the AC voltage terminal strip 40 is connected. A resetable circuit breaker 100 of conventional construction is mounted to the second end 24 of the curvilinear, tapered wall portion 22 and is connected in circuit with the AC voltage terminal strip 40 and the AC voltage surge protection circuit 93.

In order to install the AC voltage terminal strip 40 in the aperture 41, the generally rectangular floor portion 11 includes an arrangement of bosses 101 associated with respective ones of the AC voltage receptacles 42 of the terminal strip 40, so that the terminal strip 40 is supported along its length between the first end 23 of the curvilinear, tapered wall portion 22 and the first end 25 of the rear wall portion 21. The hot and neutral leads of the terminal strip are coupled to respective input ports of the AC voltage surge protection circuit 93. A reference (earth) ground conductor 110 for the terminal strip 40 and the AC voltage surge protection circuit 93 is mounted along the housing floor 10 adjacent to the terminal strip 40. Distributed along the housing floor 10 adjacent to and connected to the AC voltage terminal strip 40 are a plurality of dual blade-configured electrical connectors 120. These dual blade connectors are arranged to receive and physically capture the ground conductor elements of respective ones of the removable communication signal surge protection circuit modules 60, as the modules are installed in the slots 51.

Each of the modules 60 is generally configured as shown in FIGS. 5–8, comprising an L-shaped structure having a side wall 131 and an end wall 132 adjoined to a flexible tab 133 and containing a pair of signal input and output ports, such as RJ 45 telecommunication connectors diagrammatically shown in simplified form at 141 and 142, as non-limiting examples, it being understood that the types of connectors installed in the end wall 132 will depend upon the communication signal line application with which the module used.

Adjacent to side wall 131 are a pair of upper and lower slotted guides 151 and 152, which are sized to capture a surge protection circuit board 137, shown in dotted lines. The upper guide 151 also includes a ridge 154 which is sized to fit within a slotted rib 72 of the interior surface of the cover 30, as described above. Like AC voltage printed circuit board 90, surge protection circuit board 137 contains a conventional surge protection circuit having surge protection circuitry coupled between input and output port connections and a ground reference terminal.

The input port conductors of the surge protection circuit 137 are coupled to the conductors of the signal input port connector 141, and its output port conductors are coupled to the conductors of the signal output port connector 142. Providing a ground reference connection to a respective module's surge protection circuit board 137 is effected by means of a generally planar ground conductor 153 that extends rearwardly from the surge protection circuit board 137, and is dimensioned to fit within and be physically and electrically connected to a respective dual blade-configured electrical connector 120 of the reference ground conductor 110 that extends along the housing floor.

In order to capture the flexible tabs 133 of respective ones of the modules 60 as the modules are installed in the slots 51, the housing floor 11 contains a plurality of depressions 160 located adjacent to floor edge 33. The depressions 160 contain ramp regions 161 which terminate at openings 163, which are sized to engage the flexible tabs 133 of the communication signal surge protection circuit modules 60. Namely, as a module is being inserted into its slot, so that its generally planar ground conductor 153 is physically and electrically connected to a respective dual blade-configured electrical connector 120 of the reference ground conductor 110, the tab 133 rides over the ramp region 161 and snaps into the slot 163. The opening 163 facilitates removal of the module, by manually pushing in the tab 133, so that the tab rides over the ramp region 161, as the module is withdrawn from its slot.

As will be appreciated from the foregoing description, the physical size and cost penalties associated with conventional 'stacked' hybrid surge protection systems are effectively obviated by the surge protector housing architecture of the present invention, which provides the customer with the ability to selectively and rapidly install and remove one or more like or diverse type of communication signal surge protection circuit module in the same unitary structure as a multi receptacle AC voltage terminal strip.

While I have shown and described an embodiment in accordance with the present invention, it is to be understood that the same is not limited thereto but is susceptible to numerous changes and modifications as known to a person skilled in the art, and I therefore do not wish to be limited to the details shown and described herein, but intend to cover all such changes and modifications as are obvious to one of ordinary skill in the art.

What is claimed:

1. An electrical surge protection apparatus comprising:

a housing containing an AC voltage surge protection circuit having a reference ground conductor;

an AC voltage supply link coupled to said AC voltage surge protection circuit and having a connector configured to be coupled to a source of AC voltage external of said housing, and including a ground lead coupled to said reference ground conductor of said AC voltage surge protection circuit;

at least one AC voltage receptacle installed in a first portion of said housing, and being connected to said AC voltage surge protection circuit;

at least one communication signal surge protection circuit module installation slot in a second portion of said housing, said at least one communication signal surge protection module circuit slot providing access to said reference ground conductor and being configured to capture therein at least one removable communication signal surge protection circuit module; and at least one communication signal surge protection circuit module installed in said at least one communication signal surge protection module slot, and containing an externally accessible communication signal input port, an externally accessible communication signal output port, and a communication signal surge protection circuit that is coupled between said communication signal input and output ports, and electrically connected to said reference ground conductor.

2. An electrical surge protection apparatus according to claim 1, wherein said at least one AC voltage receptacle comprises a plurality of AC voltage receptacles installed in said first portion of said housing, and being connected to said surge protection circuit.

3. An electrical surge protection apparatus according to claim 2, wherein said at least one communication signal surge protection circuit module slot comprises a plurality of communication signal surge protection circuit module slots disposed in said second portion of said housing, said plurality of communication signal surge protection circuit module slots providing access to said reference ground conductor and being configured to capture therein plural ones of said removable communication signal surge protection circuit modules, and wherein at least one of said communication signal surge protection circuit modules is installed in at least one of said plurality of communication signal surge protection circuit module slots, such that said communication signal surge protection circuit thereof is electrically connected to said reference ground conductor.

4. An electrical surge protection apparatus according to claim 1, wherein said at least one communication signal surge protection circuit module slot comprises a plurality of communication signal surge protection circuit module slots disposed in said second portion of said housing, said plurality of communication signal surge protection circuit module slots providing access to said reference ground conductor and being configured to capture therein plural ones of said removable communication signal surge protection circuit modules, and wherein a plurality of communication signal surge protection circuit modules are installed in said plurality of communication signal surge protection circuit module slots, such that communication signal surge protection circuits thereof are electrically connected to said reference ground conductor.

5. An electrical surge protection apparatus according to claim 4, wherein said plurality of communication signal surge protection circuit modules include different types of communication signal surge protection modules.

6. An electrical surge protection apparatus according to claim 4, wherein respectively different ones of said plurality of communication signal surge protection circuit modules are configured to provide surge protection for different types of communication signal lines.

7. An electrical surge protection apparatus according to claim 4, wherein said different types of communication signal lines include those which transport telecommunication signals and cable television signals.

8. An electrical surge protection apparatus according to claim 1, wherein a respective communication signal surge protection circuit module slot includes an electrical connector disposed in proximity with and electrically connected to said reference ground conductor and being configured to capture a ground conductor element of a respective removable communication signal surge protection circuit module.

9. An electrical surge protection apparatus according to claim 8, wherein said respective communication signal surge protection circuit module slot includes an opening disposed in a floor portion of said housing, and wherein said respective communication signal surge protection circuit module includes a flexible tab that is engageable with said opening, when said respective communication signal surge protection circuit module is installed in said respective communication signal surge protection circuit module slot and said ground conductor element thereof is captured by said electrical connector disposed in proximity and electrically connected to said reference ground conductor.

10. An electrical surge protection apparatus according to claim 9, wherein said respective communication signal surge protection circuit module comprises a generally L-shaped module having a first wall adjoined by said flexible tab and containing said signal input and output ports, and a second wall adjacent to said surge protection circuit.

11. An electrical surge protection apparatus according to claim 10, wherein said housing has a floor portion, a wall portion attached to said floor portion and a cover portion attached to said wall portion, said wall portion having an aperture sized to define a plurality of communication signal surge protection circuit module slots, and wherein said floor portion has a plurality of openings, which are engaged by flexible tabs of plural communication signal surge protection circuit modules, when said plural communication signal surge protection circuit modules are installed aperture and said ground conductor elements thereof are captured by electrical connectors disposed in proximity and electrically connected to said reference ground conductor.

12. An electrical surge protection apparatus comprising:

a housing containing an AC voltage surge protection circuit having a reference ground conductor;

an AC voltage supply link coupled to said AC voltage surge protection circuit and having a connector configured to be coupled to a source of AC voltage external of said housing, and including a ground lead coupled to said reference ground conductor of said AC voltage surge protection circuit;

an AC voltage terminal strip containing a plurality of AC voltage receptacles installed in a first portion of said housing, and being connected to said AC voltage surge protection circuit;

a plurality of communication signal connector slots in a second portion of said housing, said plurality of communication signal connector slots providing access to said reference ground conductor and being configured to capture therein plural removable communication signal surge protection circuit modules; and at least one communication signal surge protection circuit module installed in at least one of said plurality of communication signal connector slots, and containing an externally accessible communication signal input port, an externally accessible communication signal output port, and a communication signal surge protection circuit that is coupled between said communication signal input and output ports is electrically connected to said reference ground conductor.

13. An electrical surge protection apparatus according to claim 12, wherein respectively different ones of said plurality of communication signal surge protection circuit modules are configured to provide surge protection for different types of communication signal lines.

14. An electrical surge protection apparatus according to claim 12, wherein said housing includes a floor and a wall extending therefrom and being engaged by a cover, said wall having a first wall portion and a second wall portion, and wherein said first and second wall portions are spaced apart from each other so as to define first and second apertures, and wherein said AC voltage terminal strip is installed in said first aperture so as to form part of said wall, and wherein said at least one communication signal surge protection circuit module is installed in said second aperture so as to form part of said wall.

15. An electrical surge protection apparatus according to claim 14, wherein said cover further includes an aperture sized to receive a switch for said AC voltage surge protection circuit to which said AC voltage terminal strip is connected, and further including a resetable circuit breaker mounted to said wall and being electrically connected to said AC voltage terminal strip and to said AC voltage surge protection circuit.

16. An electrical surge protection apparatus according to claim 14, wherein said cover has an interior surface which contains a plurality of slotted ribs that provide stabilizing guides for respective communication signal surge protection circuit modules installed in said second aperture.

17. An electrical surge protection apparatus according to claim 16, wherein said cover further includes a plurality of end wall panels for said communication signal surge protection circuit module slots, providing insulation barriers adjacent to AC voltage receptacles of said AC voltage terminal strip.

18. An electrical surge protection apparatus according to claim 14, wherein said reference ground conductor is mounted along said floor adjacent to said AC voltage terminal strip and has a plurality of electrical connectors, which are arranged to physically and electrically engage ground conductor elements of respective ones of communication signal surge protection circuit modules installed in said second aperture.

19. An electrical surge protection apparatus according to claim 18, wherein a respective communication signal surge protection circuit module comprises an L-shaped structure having a side wall and an end wall that is adjoined to a flexible tab and contains said signal input and output ports, and capturing a surge protection circuit board, which is electrically coupled to said signal input and output ports and to a ground conductor element sized to be physically and electrically connected to a respective connector of the reference ground conductor that extends along said housing floor.

20. An electrical surge protection apparatus according to claim 19, wherein said housing floor contains a plurality of openings adjacent to said second aperture of said wall and being sized to engage flexible tabs of respective communication signal surge protection circuit modules.

* * * * *